United States Patent [19]
Farr

[11] 3,885,653
[45] May 27, 1975

[54] BRAKE ADJUSTERS

[75] Inventor: Glyn Phillip Reginald Farr, Kenilworth, England

[73] Assignee: Girling Limited, Birmingham, England

[22] Filed: Sept. 27, 1973

[21] Appl. No.: 401,198

[30] Foreign Application Priority Data
Nov. 1, 1972 United Kingdom............... 50259/72

[52] U.S. Cl............................ 188/196 D; 188/71.9
[51] Int. Cl............................................ F16d 65/56
[58] Field of Search.......... 188/71.8, 71.9, 79.5 GE, 188/196 A, 196 BA, 196 D

[56] References Cited
UNITED STATES PATENTS

| | | | |
|---|---|---|---|
| 3,384,204 | 5/1968 | Swift | 188/71.9 |
| 3,726,367 | 4/1973 | Evans | 188/71.9 X |
| 3,774,733 | 11/1973 | Farr | 188/196 D |

*Primary Examiner*—Duane A. Reger
*Attorney, Agent, or Firm*—Scrivener Parker Scrivener and Clarke

[57] ABSTRACT

An automatic slack adjuster mechanism for a hydraulic brake is housed inside an auxiliary stepped piston which is itself slidingly sealed in a piston of the actuator and which is biassed by a spring against the actuator piston. A handbrake cam acts on a strut associated with the automatic adjuster mechanism and thereby acts via the adjuster mechanism on the actuator piston. The arrangement is such that the hydraulic pressure acts on the auxiliary piston to urge the latter towards the handbrake cam against the force of the spring. At relatively low pressure the spring causes the auxiliary piston to follow movement of the actuator piston and when travel of the latter is excessive due to lining wear the automatic adjuster responds to take up the excess slack. At higher braking pressures the spring is overcome and the auxiliary piston can no longer follow the travel of the actuator piston. This ensures that the adjuster mechanism does not respond to additional travel of the actuator mechanism due to deflection of the various parts of the brake under heavy loading.

24 Claims, 6 Drawing Figures

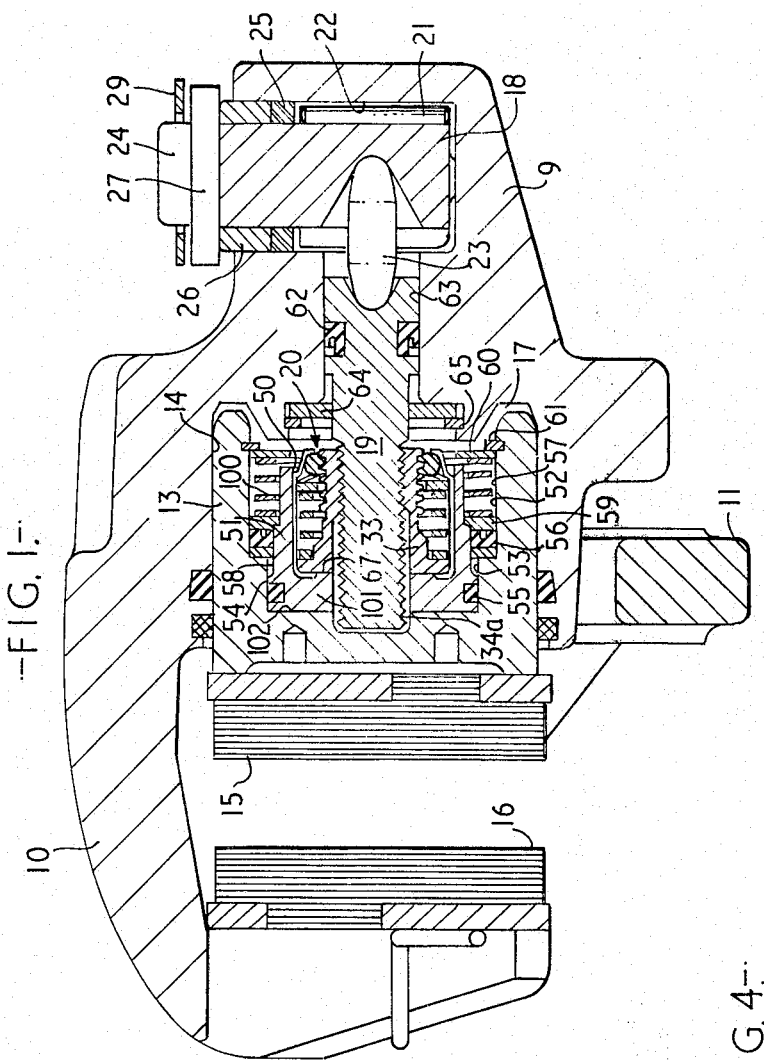
FIG.1.
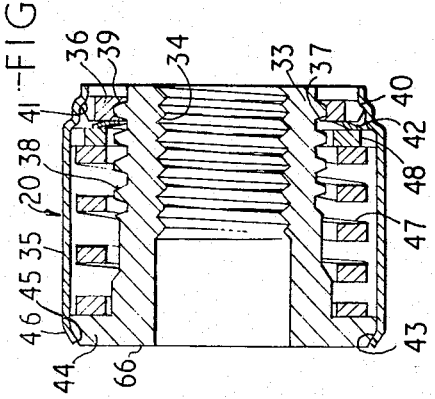
FIG.3.
FIG.4.

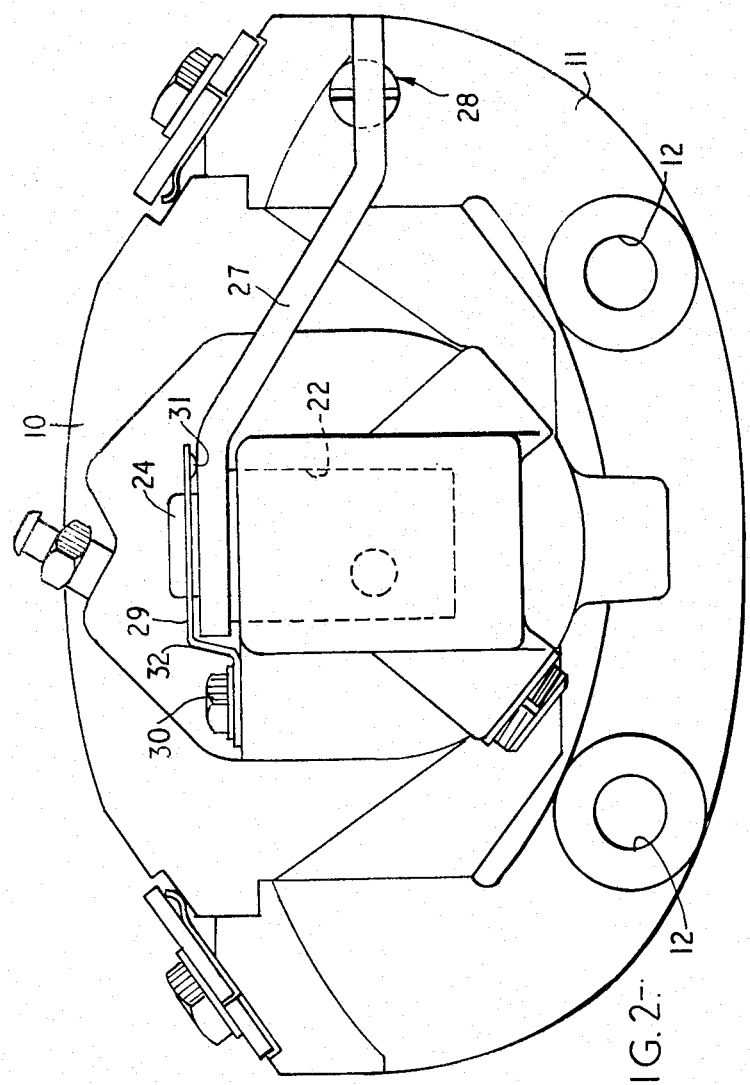

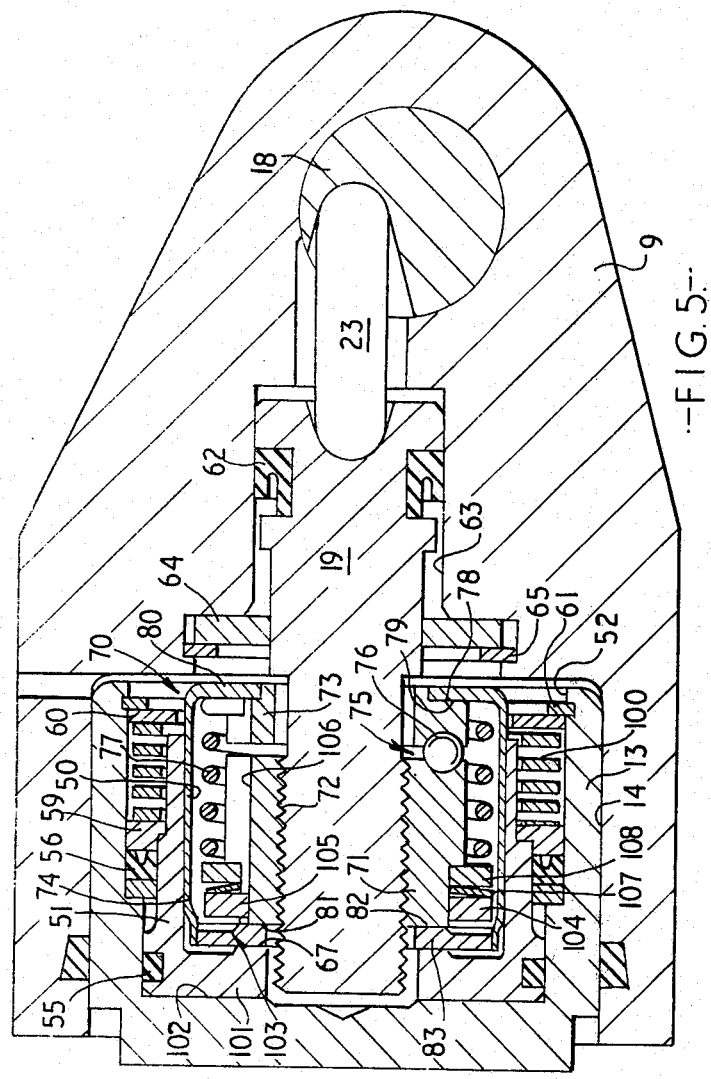

BRAKE ADJUSTERS

This invention relates to automatic adjusters for vehicle brakes.

It is desirable that automatic adjusters for vehicle brakes be load-insensitive, i.e. they should not overadjust in the event of brake deflection when the brakes are applied very strongly.

One feature of the present invention is to provide means whereby a load-sensitive automatic adjuster can be converted into a load-insensitive automatic adjuster.

An automatic adjuster for a hydraulic brake actuator which has two components relatively movable apart by the application of hydraulic pressure therebetween, according to another feature of the invention comprises an auxiliary piston sealingly slidable in one of the actuator components so as to be urged towards the other actuator component by the hydraulic pressure, a spring for biasing said auxiliary piston away from said other actuator component, and an adjuster mechanism housed in said auxiliary piston and operative between said one actuator component and an adjuster member associated with the other actuator component, said adjuster mechanism being automatically adjustable responsively to relative axial movement between said auxiliary piston and said other actuator component in excess of a desired movement.

Preferably the auxiliary piston comprises an annular or stepped piston slidingly sealed to said one actuator component at larger and smaller diameters such that the hydraulic pressure acts on said one actuator component and said auxiliary piston in opposite directions.

Conveniently said spring acts between said auxiliary piston and said one actuator component.

In advantageous embodiments of the invention the adjuster mechanism is encapsulated and can conveniently be a force fit inside a suitable bore in said auxiliary piston. In one embodiment the adjuster mechanism comprises a nut member having an internal screw thread adapted to mate with an external screw thread on a strut member to form a nonreversible screw thread connection, an encapsulating container member surrounding said nut member, said nut and container members having cooperating axial abutment surfaces, an annular member disposed within said container member and encircling said nut member, said annular member and one of said nut and container members having a reversible screw thread connection therebetween, said annular member and the other of said nut and container members having cooperating friction surfaces therebetween, and resilient means disposed within said container member and axially biasing said annular member in a direction to urge said friction surfaces towards one another.

According to another embodiment of the invention, the adjuster mechanism comprises a nut member having an internal screw thread adapted to mate with an external screw thread on a strut member to form a nonreversible screw thread connection, an encapsulating containing member surrounding said nut member, said nut and container members having coaxial abutment surfaces, an annular member disposed within said container member, said annular member and one of said nut and container members having a reversible face cam therebetween, said annular member and the other of said nut and container members having cooperating friction surfaces therebetween, and resilient means disposed within said container member and torsionally biassing said annular member in a direction to develop an axial force at said reversible face cam to urge said friction surfaces towards one another.

In a further embodiment of the invention the adjuster mechanism comprises a linear ratchet mechanism and means for positively holding the ratchet mechanism in engagement when the ratchet mechanism is under load.

Generally the automatic adjuster of the invention will be operative between said one actuator component and an auxiliary mechanical actuator in said other actuator component. Usually the mechanical actuator will comprise a cam whose axis is preferably perpendicular to the longitudinal axis of the adjuster mechanism.

According to a further aspect of the invention, a handbrake cam serving as an auxiliary mechanical actuator in a hydraulic actuator has a lever fitted to an end of the cam projecting from the actuator housing and a retention member is attached to the actuator housing and bears against the handbrake lever to resist axial movement of the handbrake cam in an outward direction with respect to the housing.

The retention member is conveniently resilient.

The invention is further described, by way of example, with reference to the accompanying drawings, in which:

FIG. 1 is a longitudinal section of an automatic adjuster in accordance with a first embodiment of the invention;

FIG. 2 is an end view of the adjuster looking from the right in FIG. 1;

FIG. 3 is a detail section to a larger scale of the adjuster mechanism in FIG. 1;

FIG. 4 is an end view of the adjuster mechanism looking from the right in FIG. 3;

FIG. 5 is a longitudinal section of a second embodiment of automatic adjuster according to the invention.

Figure 6:
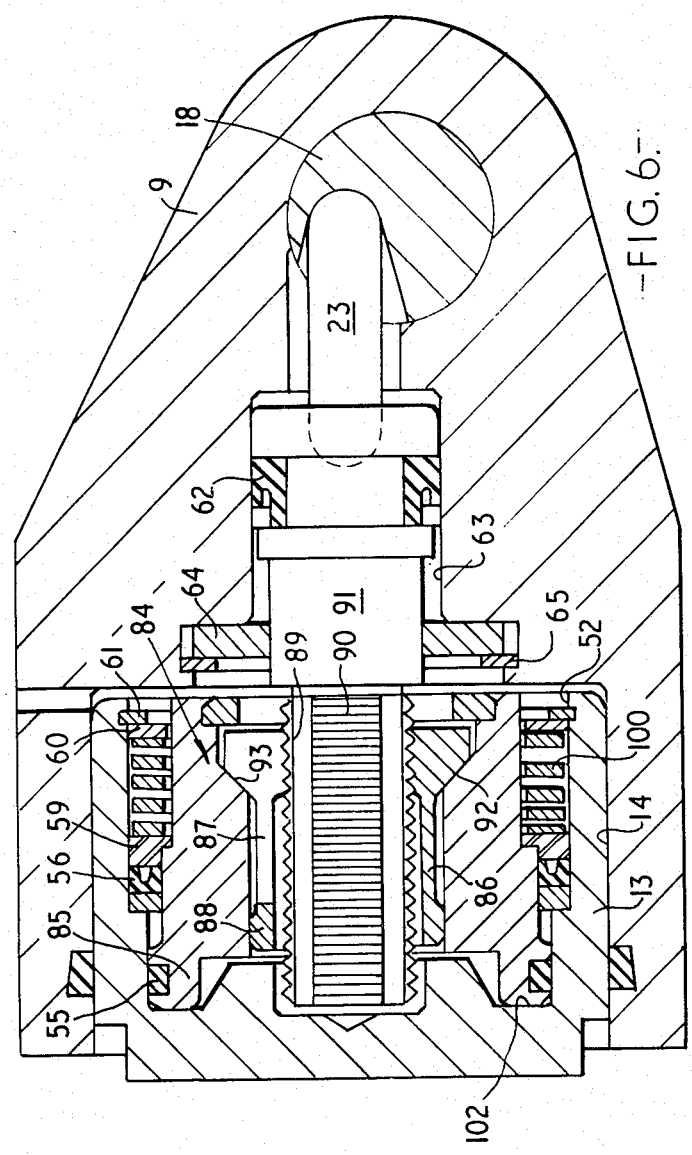
FIG. 6 is a longitudinal view of a third embodiment of automatic adjuster.

The automatic adjuster is shown in FIGS. 1 and 2 incorporated in the hydraulic actuator of a disc brake. The disc brake comprises a caliper 10 slidably mounted on a bracket 11 which can be attached by bolts passing through apertures 12 in the bracket 11 to a fixed part of the wheel mounting to which the brake is to be fitted. The hydraulic actuator comprises a piston 13 slidably mounted in a bore 14 in a body 9 of the caliper 10. The piston 13 acts on a directly operated pad assembly 15 whereas the caliper 10 straddles the disc (not shown) and acts on an indirectly operated pad assembly 16 opposed to the pad assembly 15 whereby the pad assemblies 15 and 16 act on opposite faces of the disc. To operate the brake hydraulically brake fluid is applied to the space 17 between the piston 13 and the inner end of the bore 14.

An auxiliary mechanical actuator in the form of a cam 18 is fitted to the caliper 10 and acts on the piston 13 by way of an automatic adjuster. The adjuster comprises a strut 19 and an adjuster mechanism 20.

The handbrake cam 18 is journalled by rollers 21 in a transverse bore 22 in the caliper 10 and acts by way of a dolly 23 on the righthand end of the strut 19. One end 24 of the cam 18 projects from the caliper body 9 which serves as a housing for the hydraulic and mechanical actuators. A seal 25 seals the cam 18 to the transverse bore 22 to prevent ingress of foreign matter.

The seal 25 is located within the bore 22 by a spacer 26 which abuts a handbrake lever 27 which is secured to the projecting end 24 of the cam 18 by hot rivetting. The free end of the handbrake lever 27 normally abuts a stop 28 fixed to the bracket 11. A Bowden cable or other suitable actuating means (not shown) is coupled to the free end of the handbrake lever 27.

In use of the vehicle to which the brake is fitted, it may happen that the handbrake lever 27 is struck by a flying brick or stone tending to pull the handbrake cam 18 out of its bore 22. To prevent the cam being pulled out so far that the seal 25 is dislodged from the bore 22 a retention plate 29 is attached by a bolt 30 to the caliper body 9 and extends over the side of the lever 27 remote from the cam 18. As shown in FIGS. 1 and 2 the retention plate 29 is doublecranked and straddles the projecting end 24 of the cam 18. The plate 29 may be bifurcated or may have an aperture to receive the projecting end 24. The retention plate 29 is made of resilient steel and its free end has a projection 31 by which it presses resiliently against the handbrake lever 27 to bias the handbrake cam 18 into its bore 22. It will be noted that the free length of the leaf spring formed by the resilient retention plate 29 is sufficient for a comparatively light biassing force to be applied to the cam 18. However, upon a small axial displacement of the cam 18 out of its bore 22 one edge of the handbrake lever 27 comes into abutment with the inside corner 32 of the retention plate 29 thereby strongly resisting further axial displacement of the cam 18.

The adjuster mechanism 20 includes a nut 33 having an internal screw thread 34 which mates with an external screw thread 34a on the lefthand end of the strut 19 to form a nonreversible screw thread connection. The adjuster mechanism 20 is shown in more detail in FIGS. 3 and 4 wherein it will be seen that the mechanism 20 includes an encapsulating container 35 and an annulus 36. The annulus 36 is disposed within the container 35 and surrounds the nut 33. The annulus 36 has a multi-start internal screw thread 37 mating with a multi-start external screw thread 38 on the nut 33 to form a reversible screw thread connection 39. The reversible screw thread connection 39 is of the opposite hand to the non-reversible screw thread connection formed by the threads 34 and 34a.

The annulus 36 has an external conical friction surface 40 which cooperates with an internal annular friction surface 41 defined by a step inside the encapsulating container 35. Resilient means in the form of a bowed washer spring 42 acts on the annulus 36 in a direction to axially bias the friction surfaces 40 and 41 into frictional engagement with one another.

An abutment surface 43 on a flanged end 44 of the nut 33 cooperates with a complementary abutment surface 45 formed by a peened over edge 46 of the encapsulating container 35. An additional spring 47 acts on the nut 33 to axially bias the nut in a direction to bring the abutment surfaces 43 and 45 into engagement with one another. The spring 47 acts between the flange 44 on the nut 33 and a washer 48 which bears against an additional abutment surface formed by a second step inside the encapsulating container 35. The spring 42 acting on the annulus 36 is disposed between this annulus and the washer 48.

The annulus 36 and the nut 33 are made of steel. The encapsulating container 35 is made of pressed steel. Normal manufacturing tolerances are provided at the non-reversible screw thread connection 34, 34a but substantial axial clearance is provided at the reversible screw thread connection 39 in order to accommodate the normal axial travel of the piston 13 relative to the caliper 10 as will be described more fully hereinafter. The adjuster mechanism 20 can be readily manufactured using production line techniques.

The adjuster mechanism 20 is force fitted in an internal bore 50 of an auxiliary piston 51 whereby the adjuster mechanism is accommodated in this auxiliary piston. The auxiliary piston 51 is itself accommodated in a blind bore 52 in the actuator piston 13. The blind bore 52 is stepped and its smaller diameter portion 53 is sealed to a larger diameter portion 54 of the auxiliary piston 51 by a sealing ring 55. A second sealing ring 56 seals a larger diameter portion 57 of the bore 52 to a smaller diameter portion 58 of the auxiliary piston 51. The auxiliary piston 51 thus acts as a stepped piston on which the fluid pressure applied to the space 17 acts to the left over the cross-sectional area of the smaller diameter portion 58 and acts to the right over the cross-sectional area of the larger diameter portion 54, the fluid pressure finding its way to the left hand face of the auxiliary piston 51 via the screw-thread connection 34, 34a. Therefore the auxiliary piston 51 is urged to the right, i.e., away from the piston 13 and towards the caliper body 9 by the fluid pressure applied to the space 17. This rightward movement of the auxiliary piston 51 is resisted by a spring 100 which acts between a washer 59 resting against a step around the outer periphery of the auxiliary piston 51 and another washer 60 retained in the blind bore 52 of the actuator piston 13 by a spring ring 61 received in a groove inside the piston 13.

The strut 19 is sealed by a sealing ring 62 to a smaller diameter bore 63 in the caliper body 9. To prevent the strut 19 from turning, it has a pair of opposed flats which are received in a rectangular opening of a disc 64 such that the flats of the strut lie closely against the longer sides of this rectangular opening but the strut is spaced from the shorter sides of this opening. The disc 64 is retained by a spring ring 65 in a somewhat larger diameter bore portion in the caliper body 9. The disc 64 is prevented from rotating by a peg (not shown) which is located in a hole in the caliper body 9 extending parallel to the axis of the adjuster and which is disposed on the disc 64 adjacent one of the shorter sides of the opening in the disc 64. By such location of the hole and by clearances between the strut 19 and the shorter sides of the rectangular opening in the disc 64 the strut 19 can perform a small degree of universal motion with respect to the disc 64 to compensate for slight misalignment of the various parts of the actuator.

In the normal resting position the lefthand face 66 of the nut 33 rests against a face 67 of an internal flange 101 in the auxiliary piston 51, which in turn rests against the base 102 of the blind bore 52 in the actuator piston 13. During operation of the brake hydraulically when no adjustment is required, relative movements between the auxiliary piston 51 and the strut 19 are accommodated by the clearances at the screw thread connections, mainly that at the screw thread connection 39, the strut 19 being urged to the right against the handbrake cam 18 via the dolly 23 by the hydraulic pressure in the space 17 acting rightwardly on the strut. Handbrake application urges the strut 19 to the left whereby the strut acts on the piston 13 through the non-reversible screw thread connection 34, 34a, the nut face 66 and the internal flange 101.

It will now be supposed that some brake lining wear has taken place and the operation of the adjuster will be considered as the brake pressure is released inasmuch as the pad wear takes place when the brake is applied. The pressure at which the auxiliary piston 51 can move to the right against the force of the spring 100 is small compared with the brake pressures occurring during brake operation. Thus, while the brake is applied, not only the strut 19 is moved to the right but also the auxiliary piston 51. The abutment surface 43 is thereby held in engagement with the abutment surface 45 (or rather the face 66 is held in abutment with the face 67) so that the adjuster mechanism itself adopts the state illustrated in FIG. 3. As the brake is released the brake pressure falls below the comparatively low predetermined value at which the spring 100 can be overcome. It will be noted that at this comparatively low brake pressure any caliper deflection will be negligible. As the pressure falls below this predetermined value the spring 100 moves the auxiliary piston 51 to the left relative to the strut 19 to separate the face 66 on the nut 33 from the face 67. If no pad wear had taken place consequent relative movement between the container 35 and the nut 33 would be accommodated by the clearance at the reversible screw thread connection 39 so that the adjuster mechanism would not operate. However, with the pad wear which has taken place the annulus 36 is moved by the container 35 to the left relative to the nut 33 by an extent greater than the axial clearance at the reversible screw thread connection 39. The annulus 36 is prevented from turning by the friction developed at the annular friction surfaces 40 and 41 due to the force of the spring 42. The reversible screw thread connection 39, therefore, causes the nut 33 to be turned on the strut 19 whereby adjustment is effected at the non-reversible screw thread connection 34, 34a. Finally, as the brake pressure in the space 17 is completely dissipated the piston 13 moves further to the right relative to the caliper body 9 until the face 67 abuts the lefthand face 66 of the nut 33. The spring 47 urges the faces 66 and 67 into engagement with one another, but due to the relative rotation which has taken place between the annulus 36 and the nut 33 the axial clearance at the reversible screw thread connection 39 is taken up before the faces 66 and 67 abut whereby the load on the friction surfaces 40 and 41 is removed permitting the annulus 36 to turn on the nut 33 until finally the adjuster mechanism returns to the resting position illustrated in FIG. 3.

The automatic adjuster illustrated is of the so-called incremental type, i.e., automatic adjustment effected at the non-reversible screw thread connection 34, 34a as the brake is released is less than the excess travel which took place due to the pad wear owing to the fact that the reversible screw thread connection 39 has a much greater pitch than the non-reversible screw thread connection 34, 34a. A further incremental adjustment can, therefore, take place the next time the brake is applied since during brake application the auxiliary piston 51 and the strut 19 first move in opposite directions until the comparatively low pressure at which the spring 100 can be overcome is reached. The adjuster mechanism, therefore, performs an adjustment cycle on brake application in the same way as that which takes place on brake release. Since this adjustment cycle takes place at a comparatively low pressure at which caliper deflection is negligible, caliper deflection does not cause overadjustment.

It will be noted that when the nut 33 of the adjuster mechanism abuts the face 67 the abutments 43 and 45 also engage one another. Such a situation can be achieved by force fitting the adjuster mechanism 20 by applying a load to the righthand face of the nut 33 or to the strut 19. Rightward movement of the auxiliary piston 51 relative to the actuator piston 13 is limited by the washer 60 to prevent cross-compression of the spring 100. In certain cases, for example if the brake is operated without the pad assemblies in place, or if for some reason new pad assemblies are replaced by worn pad assemblies, the very substantial movement which takes place between the piston 13 and the caliper body 9 does not damage the adjuster mechanism 20 because the force applied to the adjuster mechanism is limited by the force fit of the mechanism in the bore 50 whereby the adjuster mechanism is pulled somewhat out of this bore. It is returned to position the next time the handbrake is applied.

FIG. 5 of the drawings shows another embodiment of hydraulic actuator of a disc brake in which the function of the reversible screw thread connection the adjuster mechanism is taken over by a reversible face cam. In FIG. 5 parts like those of FIGS. 1 to 4 are denoted by like reference numerals, and it will be seen that only the adjuster mechanism 70 differs from that of FIGS. 1 to 4. The adjuster mechanism 70 comprises a nut 71 having a non-reversible screw thread connection 72 with the spindle 19, an annulus 73 and an encapsulating container 74 housing the nut 71 and the annulus 73. A reversible face cam 75 is provided between the nut 71 and the annulus 73 and comprises three balls 76 (only one of which is shown) received in helically inclined recesses in the nut and the annulus. A torsion spring 77 acts between the nut and the annulus in a direction in which the face cam 75 urges the nut 71 and the annulus 73 axially apart. The annulus 73 has an abutment face 78 resting against a complementary abutment face 79 formed by an inturned flange 80 on one end of the encapsulating container 74. The nut 71 rests by a friction face 81 against a complementary friction face 82 on a washer 83 which closes one end of the encapsulating container 74 and which rests against the face 67 on the internal flange 101 of the auxiliary piston 51.

As in the preceding embodiments the encapsulating container 74 is force fitted in the bore 50 of the auxiliary stepped piston 51. The operation of the auxiliary piston 51 to achieve an adjustment cycle at a comparatively low brake pressure is as described with reference to FIGS. 1 to 4. However, the operation of the adjuster mechanism 70 differs from that of the mechanism 20 in that the normal axial travel is accommodated entirely by clearance at the non-reversible screw thread connection 72, and in the event of adjustment being required the nut 71 is pushed towards the annulus 73 whereby the reversible face cam 75 turns these two members relative to one another. During the first part of the cycle the nut 71 is turned on the strut 19 and during the second part of the cycle the annulus 73 turns relative to the encapsulating container 74. A fuller description of the operation of this type of adjuster can be found in British Pat. Specification No. 1,179,235.

To prevent so-called "knock back", a ratchet mechanism 103 is provided in the embodiment of FIG. 5. This mechanism comprises a ring 104 which encircles the nut 71 and which has three circumferentially spaced pawls (not shown) cooperating with twenty circumferentially spaced ratchet teeth on the righthand face of the washer 83 such that one pawl can engage one ratchet tooth at any given time. The washer 83 cannot rotate and the ring 104 has three internal fingers 105 which engage in longitudinal grooves 106 in the nut 71 to prevent the ring 104 from turning relative to the nut 71. A conical washer 107 acts between the ring 104 and an abutment ring 108 and serves to bias the pawl ring 104 against the washer 83. The ratchet mechanism 103 prevents rotation of the nut 71 on the strut 19 in the wrong direction in the event of the piston 13 being pushed back into its bore 14 in the event of disc deflection, e.g., on cornering. The ratchet mechanism 103 does not affect the automatic adjustment effected by the face cam 75.

FIG. 6 of the drawings shows the invention as applied to a ratchet type adjuster and again parts like those of the previous embodiments are denoted by like reference numerals. In this embodiment the adjuster mechanism 84 is not encapsulated but includes a member which is formed integrally with the auxiliary stepped piston 85. The adjuster mechanism 84 comprises a sleeve 86 which is longitudinally slit from the righthand end to provide resilient fingers 87 attached to an annulus 88. The free ends of the fingers 87 are provided on their inside faces 89 with serrations which can mate with complementary serrations 90 on the strut 91. The outside faces of the free ends of the springy fingers 87 are provided with inclined surfaces 92 cooperating with an inclined step 93 inside the auxiliary piston 85. The handbrake force from the cam 18 is applied via a dolly 23 to the strut 91 (equivalent to the strut 19 of the preceding embodiments) and from there via the serrations 89 and 90 to the sleeve 86 from where it is transferred via the inclined surfaces 92 and 93 to the auxiliary piston 85 which bottoms against the base 102 of the blind bore 52 in the actuator piston 13.

While in this embodiment the auxiliary piston 85 forms a part of the adjuster mechanism, it does operate to produce an adjustment cycle at a comparatively low brake pressure as in the preceding embodiments.

The spacing of the serrations 89 and 90 is such that the ratchet mechanism is only stepped when excess brake travel has taken place. It will be noted that due to the inclined faces 92 and 93 the serrations 89 and 90 are urged positively into engagement with one another under the effect of the handbrake thrust. A fuller description of the ratchet type of adjuster shown in FIG. 6 can be found in British Pat. Specification No. 1,152,712.

I claim:

1. In a hydraulic brake actuator which has two components relatively movable apart by the application of hydraulic pressure therebetween, an automatic slack adjuster which comprises an auxiliary stepped piston having first and second external cylindrical surfaces of larger and smaller diameter respectively and having a hollow interior, first and second sealing means slidably sealing one of the actuator components to said first and second cylindrical surfaces such that the hydraulic pressure acts on said one actuator component and said auxiliary piston in opposite directions so that said auxiliary piston is urged towards the other actuator component by the hydraulic pressure, a spring biassing said auxiliary piston away from said other actuator component, an adjuster member associated with said other actuator component, and an adjuster mechanism disposed essentially in said hollow interior of said auxiliary piston and operative between said one actuator component and said adjuster member, said adjuster mechanism being automatically adjustable responsively to relative axial movement between said auxiliary piston and said other actuator component in excess of a desired movement.

2. An adjuster according to claim 1 in which said spring acts between said auxiliary piston and said one actuator component.

3. An adjuster according to claim 1 in which said adjuster mechanism includes an encapsulating container member and said auxiliary piston has a bore, said adjuster mechanism being disposed in said bore.

4. An adjuster according to claim 3 in which said container member is force fit in said bore in said auxiliary piston.

5. An adjuster according to claim 1 in which said adjuster mechanism comprises a mechanism of adjustable length, operative between said auxiliary piston and said other actuator member and comprising intermediate members having an axis common with the actuator axis, and connections between said auxiliary piston and said intermediate members, one of said connections being a non-reversible screw-thread connection and another of said connections comprising at least one helically inclined surface means providing an axial interengagement.

6. An adjuster according to claim 5 in which said axial interengagement comprises a reversible screw thread connection.

7. An adjuster according to claim 5 in which said axial interengagement comprises a reversible face cam.

8. An adjuster according to claim 3 in which said adjuster member comprises a strut member and in which said adjuster mechanism comprises a nut member having an internal screw thread adapted to mate with an external screw thread on said strut member to form a non-reversible screw thread connection, said encapsulating container member surrounding said nut member and said nut and container members having cooperating axial abutment surfaces, an annular member disposed within said container member and encircling said nut member, said annular member and one of said nut and container members having a reversible screw thread connection therebetween, said annular member and the other of said nut and container members having cooperating friction surfaces therebetween, and resilient means disposed within said container member and axially biassing said annular member in a direction to urge said friction surfaces towards one another.

9. An adjuster according to claim 8 in which said reversible screw thread connection is between said annular and nut members and comprises an internal thread in the former and an external thread on the latter.

10. An adjuster according to claim 3 in which said adjuster member comprises a strut member and in which said adjuster mechanism comprises a nut member having an internal screw thread adapted to mate with an external screw thread on said strut member to form a non-reversible screw thread connection, said encapsulating containing member surrounding said nut member and said nut and container members having coaxial abutment surfaces, an annular member disposed within said container member, said annular member and one of said nut and container members having a reversible face cam therebetween, said annular member and the other of said nut and container members having cooperating friction surfaces therebetween, and resilient means disposed within said container member and torsionally biassing said annular member in a direction to develop an axial force at said reversible face cam to urge said friction surfaces towards one another.

11. An adjuster according to claim 10 in which said face cam is between said annular and nut members and the last-mentioned resilient means comprises a torsion spring also operative between said annular and nut members.

12. An adjuster according to claim 11 which further comprises a one way clutch mechanism operative between the nut and container members.

13. An adjuster according to claim 12 in which said one way clutch mechanism comprises a ratchet mechanism.

14. An adjuster according to claim 1 in which said adjuster mechanism comprises a linear ratchet mechanism and means for positively holding said ratchet mechanism in interengagement when the ratchet mechanism is under load.

15. An adjuster according to claim 14 in which said ratchet mechanism comprises at least one pawl having a free end engageable with a row of ratchet teeth, an inclined surface on said pawl free end and a thrust surface normally engaging said free end of said pawl through said inclined surface to urge said pawl more firmly into engagement with the ratchet teeth.

16. An adjuster according to claim 15 in which said ratchet mechanism has several pawls in the form of fingers constituted by a longitudinally slit sleeve which encircles the row of ratchet teeth.

17. An adjuster according to claim 15 in which said thrust surface is on said auxiliary piston.

18. In a hydraulic brake actuator which has first and second components relatively movable apart by the application of hydraulic pressure therebetween and which has an auxiliary mechanical actuator in said second component, an automatic slack adjuster which is operative between said first component and said auxiliary mechanical actuator and which comprises an auxiliary stepped piston having first and second external cylindrical surfaces of larger and smaller diameter respectively and having a hollow interior, first and second sealing means slidably sealing said first actuator component to said first and second cylindrical surfaces such that the hydraulic pressure acts on said first actuator component and said auxiliary piston in opposite directions so that said auxiliary piston is urged towards said second actuator component by the hydraulic pressure, a spring biassing said auxiliary piston away from said second actuator component, an adjuster member disposed to receive thrust from said auxiliary mechanical actuator, and an adjuster mechanism disposed essentially in said hollow interior of said auxiliary piston and operative between said first actuator component and said adjuster member, said adjuster mechanism being automatically adjustable responsively to relative axial movement between said auxiliary piston and said second actuator component in excess of a desired movement.

19. An actuator according to claim 18 in which said auxiliary mechanical actuator comprises a cam journalled in said second actuator component.

20. An actuator according to claim 19 in which the rotary axis of said cam is perpendicular to the longitudinal axis of the adjuster mechanism.

21. An actuator according to claim 19 which includes a lever fitted to an end of said cam projecting outwardly of said second actuator component and a retention member attached to said second actuator component and bearing against said lever to resist outward movement of the cam along its axis.

22. An actuator according to claim 21 in which said retention member is resilient.

23. A hydraulic actuator according to claim 1 in which said one actuator component comprises an actuator piston.

24. An actuator according to claim 23 in which said other actuator component comprises a cylinder body having a cylinder bore in which said actuator piston is slidable.

* * * * *